United States Patent
Blount et al.

(10) Patent No.: US 9,191,790 B2
(45) Date of Patent: Nov. 17, 2015

(54) METHOD OF ANIMATING MOBILE DEVICE MESSAGES

(71) Applicants: Umar Blount, Commerce, GA (US); Amani Bradshaw, Commerce, GA (US)

(72) Inventors: Umar Blount, Commerce, GA (US); Amani Bradshaw, Commerce, GA (US)

( * ) Notice: Subject to any disclaimer, the term of this patent is extended or adjusted under 35 U.S.C. 154(b) by 0 days.

(21) Appl. No.: 14/080,687

(22) Filed: Nov. 14, 2013

(65) Prior Publication Data

US 2015/0133176 A1    May 14, 2015

(51) Int. Cl.
  *H04L 29/08* (2006.01)
  *H04W 4/00* (2009.01)
  *H04W 4/12* (2009.01)
  *H04W 4/18* (2009.01)

(52) U.S. Cl.
  CPC . *H04W 4/12* (2013.01); *H04W 4/18* (2013.01)

(58) Field of Classification Search
  CPC .................................................. H04L 12/5835
  See application file for complete search history.

(56) References Cited

U.S. PATENT DOCUMENTS

| | | | |
|---|---|---|---|
| 7,921,013 B1 | 4/2011 | Ostermann et al. | |
| 8,281,239 B2 | 10/2012 | Kuhl et al. | |
| 8,290,478 B2 | 10/2012 | Shim et al. | |
| 8,332,756 B2 | 12/2012 | Kuhl et al. | |
| 2005/0163379 A1 | 7/2005 | Zimmermann | |
| 2007/0094330 A1 | 4/2007 | Russell | |
| 2008/0254779 A1* | 10/2008 | Hwang et al. | 455/414.4 |
| 2010/0159965 A1* | 6/2010 | Pascal et al. | 455/466 |
| 2011/0007077 A1 | 1/2011 | Kamath et al. | |
| 2011/0055336 A1* | 3/2011 | Park et al. | 709/206 |
| 2012/0030038 A1 | 2/2012 | Russell et al. | |
| 2012/0182309 A1* | 7/2012 | Griffin et al. | |
| 2013/0120429 A1 | 5/2013 | Sukup | |

* cited by examiner

Primary Examiner — Thomas Lett
(74) Attorney, Agent, or Firm — The Keys Law Firm PLLC

(57) ABSTRACT

An system and method for converting standard characters or emoticons in electronic messaging service messages to animated characters. The system and method for animating electronic messages is embodied on a mobile electronic communications device configured through executable software to perform the primary steps of identifying convertible characters, associating convertible characters with a corresponding, stored animation, and converting the associated convertible character with the corresponding animation. Text or emoticons in messages sent over electronic messaging services such as SMS and MMS, is converted into animated characters prior to transmission from the sending mobile electronics communications device. The animated message, or message with contains an animated character, is then received and displayed on the receiving mobile electronic communications device through its conventional MMS messaging handling system.

3 Claims, 2 Drawing Sheets

METHOD OF ANIMATING MOBILE DEVICE MESSAGES

BACKGROUND OF THE INVENTION

1. Field of the Invention

This invention relates generally to mobile device communication applications and, more particularly, to a system and method for converting characters entered on a user interface to images or animations on a display.

2. Description of the Prior Art

The use of mobile electronic communications devices, such as smart phones, to send and receive messages is well known. Electronic messaging services such as short messaging service ("SMS") and multimedia messaging service (MMS) are well established, and a employed in societies across the globe daily to facilitate communication between users of such communications devices.

One result of the proliferation mobile electronic communication devices and the increasing use of electronic messaging services has been the development of various acronyms and shorthand expressions for various thoughts and reactions a user may have during a messaging conversation. In accordance with the same, conventional messaging service software on mobile electronic communications devices allow a user to covey emotion or express a current disposition through the use of emoticons. A problem which still exists, however, is that conventional emoticons are static, bland, and sometimes difficult to comprehend. Thus, what is needed is an electronic messaging system and method which causes to be displayed an animated character who acts out and/or demonstrates the emotions or thoughts connected with a particular emoticon. It would be helpful if such a system and method for animating electronic messages was configured to automatically integrate into exiting messaging service applications of a mobile device. It would be additionally desirable for such a system and method for animating electronic messages to automatically associate animations with characters or emoticons in a message and replace such characters or emoticons with associated animations.

The Applicant's invention described herein provides for a system and method for replacing designated characters and/or emoticons in electronic messages with an animated character who acts out a thought or message. The primary steps of Applicant's system and method for animating electronic messages include identifying an particular emoticon or character string in a message, associating the identified emoticon or character string, and replacing the associated emoticon or character string with an animated character. When in operation, the system and method for animating electronic messages allows a user to send and receive an animated character over conventional messaging systems in place of standard characters or emoticons. As a result, many of the limitations imposed by conventional messaging services are removed.

SUMMARY OF THE INVENTION

An system and method for converting standard characters or emoticons in electronic messaging service messages to animated characters. The system and method for animating electronic messages is embodied on a mobile electronic communications device configured through executable software to perform the primary steps of identifying convertible characters, associating convertible characters with a corresponding, stored animation, and converting the associated convertible character with the corresponding animation. Text or emoticons in messages sent over electronic messaging services such as SMS and MMS, is converted into animated characters prior to transmission from the sending mobile electronics communications device. The animated message, or message with contains an animated character, is then received and displayed on the receiving mobile electronic communications device through its conventional MMS messaging handling system.

The software application is configured to integrates itself as an extension (or add on) program whose functions can be launched while within another executable program. It includes a function aspect which defines a plurality of software functions which perform required tasks for specified operations and a database aspect database aspect which stores the character animation material, along with listings of associated standard character strings and/or emoticons to which the various character animations are associated with.

It is an object of this invention to provide an electronic messaging system and method which causes to be displayed an animated character who acts out and/or demonstrates the emotions or thoughts connected with a particular emoticon.

It is another object of this invention to provide a system and method for animating electronic messages configured to automatically integrate into exiting messaging service applications of a mobile device.

It is still another object of this invention to provide a system and method for animating electronic messages which automatically associates animations with characters or emoticons in a message and replace such characters or emoticons with associated animations.

These and other objects will be apparent to one of skill in the art.

DETAILED DESCRIPTION OF THE INVENTION

Figure 1:
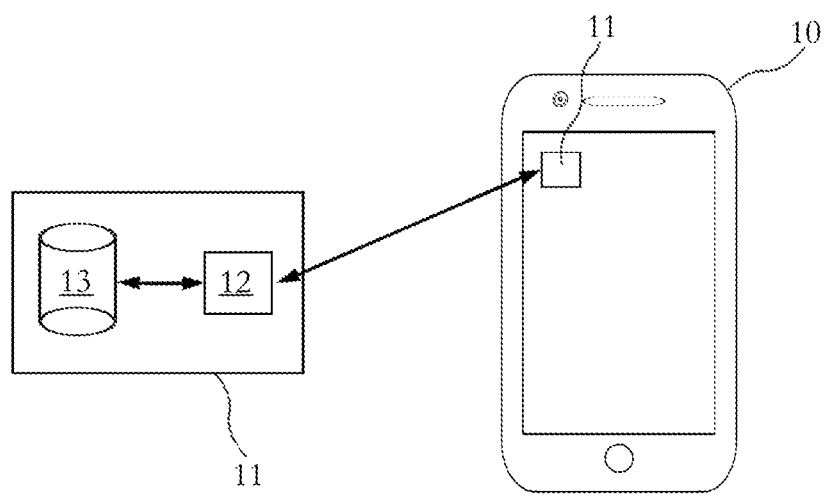
FIG. 1 is a block diagram of the operational aspects of a system and method for animating electronic messages built in accordance with the present invention.

Referring now to the drawings and in particular FIG. 1, a system and method for animating electronic messages is embodied as on a mobile electronic communications device having installed thereon particular executable software. In a preferred embodiment, the mobile electronics communications device is a smart phone 10 and the executable software is an animating software application 11. It is understood that the system and method of the present invention, however, may be performed on any electronic communications device which is capable of running executable software, including a computer, media device, or tablet, and able to send and receive MMS messages. The software application 11 is configured to be installed on the smart phone 10 and operate in conjunction with the operating system software and the user interface hardware of the smart phone 10. Particularly, the software application 11 integrates itself as an extension (or add on) program whose functions can be launched while within another executable program. In this regard, the software application 11 can be configured as a standalone executable program and used in conjunction with conventional messaging software on the smart phone. In an alternate embodiment, the software application 11 is additionally configured to allow for messaging services. such as SMS and MMS, to be initiated directly through the executable aspect of the program.

The software application 11 includes a function aspect 12 and a database aspect 13. The function aspect 12 defines a plurality of software functions which perform required tasks for specified operations. The database aspect 13 stores the character animation material, along with listings of associated standard character strings and/or emoticons to which the various character animations are associated with.

Figure 2:
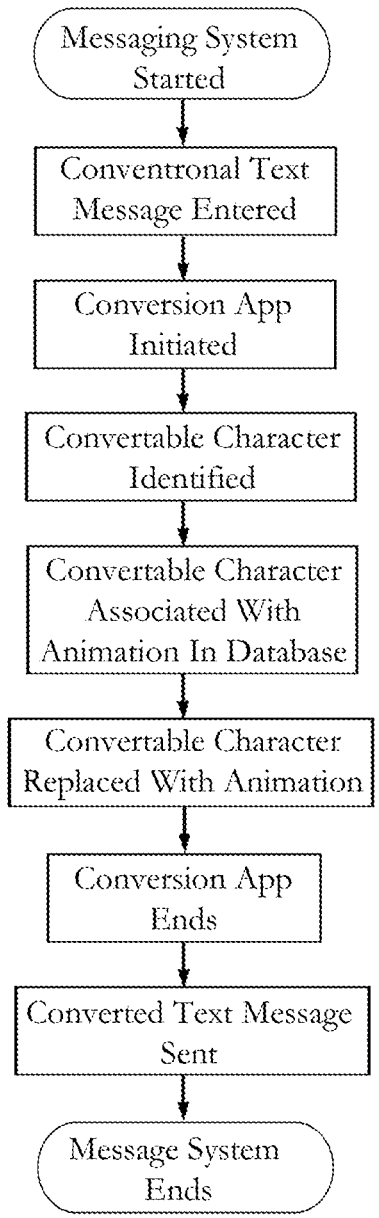
FIG. 2 shows the process steps through which a conventional character message or an emoticon is converted to include a animated character message.

Referring now to FIG. 2, the process through which the software application animates electronic messages, including SMS or MMS messages begins when the conventional message system of a smart phone configured to operate in accordance with the present system and method. The smart phone is configured by way of having the animating software application installed thereon. Next, a user can enter in a conventional text message, which includes standard characters and/or emoticons. The user then initiates the conversion app as an extension to the convention message system software. The conversion app scans the characters and/or emoticons of conventional message and identifies convertible characters. Convertible characters are standard character strings and/or emoticons which are in the database aspect, thus having an associated animated character. Once convertible characters are identified, the association is made with the corresponding animated character in the database, the convertible character is deleted, and the associated animated character is inserted in its place. At that point, the conversion app ends and the smart phone can cause the message, which now includes the animated character, to send. The message that is sent includes the necessary code to allow the animation to play in accordance with a conventional MMS compatible software. As such, it is understood that any SMS message on which the conversion app runs and inserts an animated character is also converted by the conversion app to an MMS message.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for converting standard characters or emoticons in electronic messaging service messages to animated characters, comprising the steps of:
   configuring an electronic communications device to send and receive messages over an electronic messaging system;
   providing by said electronic communications device and message interface that enables the entry of a message input in the form of text, emoticons, or other standard characters for transmission over the electronic messaging system;
   identifying by said electronic communications device one or more convertible characters in the message input, wherein convertible characters are standard character strings and/or emoticons which correspond to standard character strings and/or emoticons having a predetermined, associated animated character;
   associating by said electronic communications device identified convertible characters with the associated animated character;
   replacing by said electronic communications device associated convertible characters with the associated animated character, wherein the steps of identifying, associating and replacing are performed within the message interface; and
   enabling by said electronic communications device the transmission of the message input having at least one convertible character therein replaced with the associated animated character over an electronic messaging system.

2. The method of claim 1, wherein said mobile communications device is configured to perform the steps of identifying, associating and replacing through the installation and execution of a software app.

3. The method of claim 1, wherein said electronic communications device is configured send and receive messages over SMS and MMS.

* * * * *